United States Patent [19]
Odier

[11] 3,837,221
[45] Sept. 24, 1974

[54] LONGITUDINAL POSITIONING STOP FOR FIXED STATION AUTOMOBILE VEHICLE TEST BEDS

[75] Inventor: Jean Odier, Antony, France

[73] Assignee: Societe Anonyme Francaise du Ferodo, Paris, France

[22] Filed: Sept. 7, 1972

[21] Appl. No.: 286,910

[30] Foreign Application Priority Data
Nov. 3, 1972    France .............................. 72.32377

[52] U.S. Cl. ................................................ 73/124
[51] Int. Cl. ............................................ G01l 5/13
[58] Field of Search .............................. 73/124, 117

[56] References Cited
UNITED STATES PATENTS
3,581,560    6/1971    Odier ................................... 73/117

*Primary Examiner*—Jerry W. Myracle
*Attorney, Agent, or Firm*—Young & Thompson

[57] ABSTRACT

A longitudinal positioning stop for fixed station automobile vehicle test beds, of the type allowing the said vehicle five degrees of freedom of movement namely, lateral translation, vertical translation, and rotation about three axes, provided with a vehicle support platform, a carriage moveable horizontally in a direction called the transversal direction, a column mounted for movement in a vertical direction, a bracket mounted for rotation about a vertical axis, a first body permitting rotation about a first horizontal axis, a second body permitting rotation about a second horizontal axis, the said horizontal axis converging at a centre of rotation situated on the said second vertical axis.

25 Claims, 6 Drawing Figures

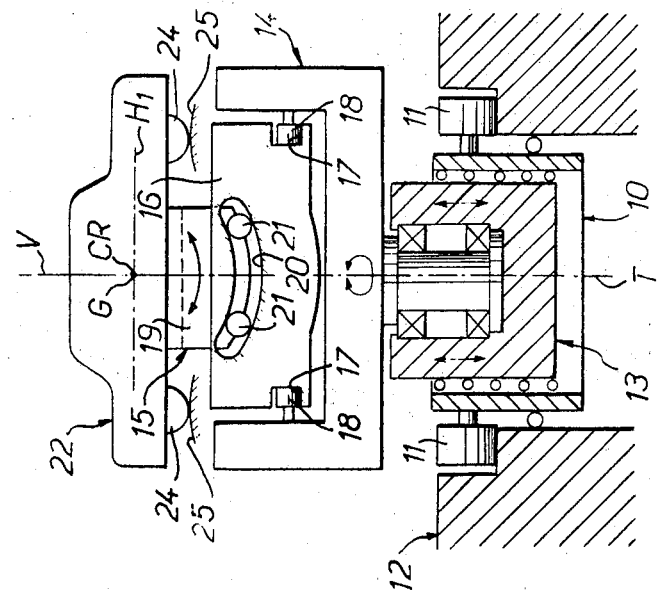
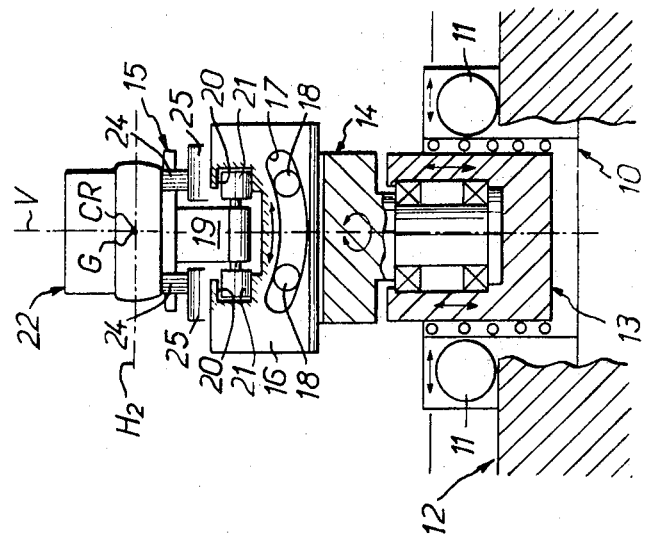

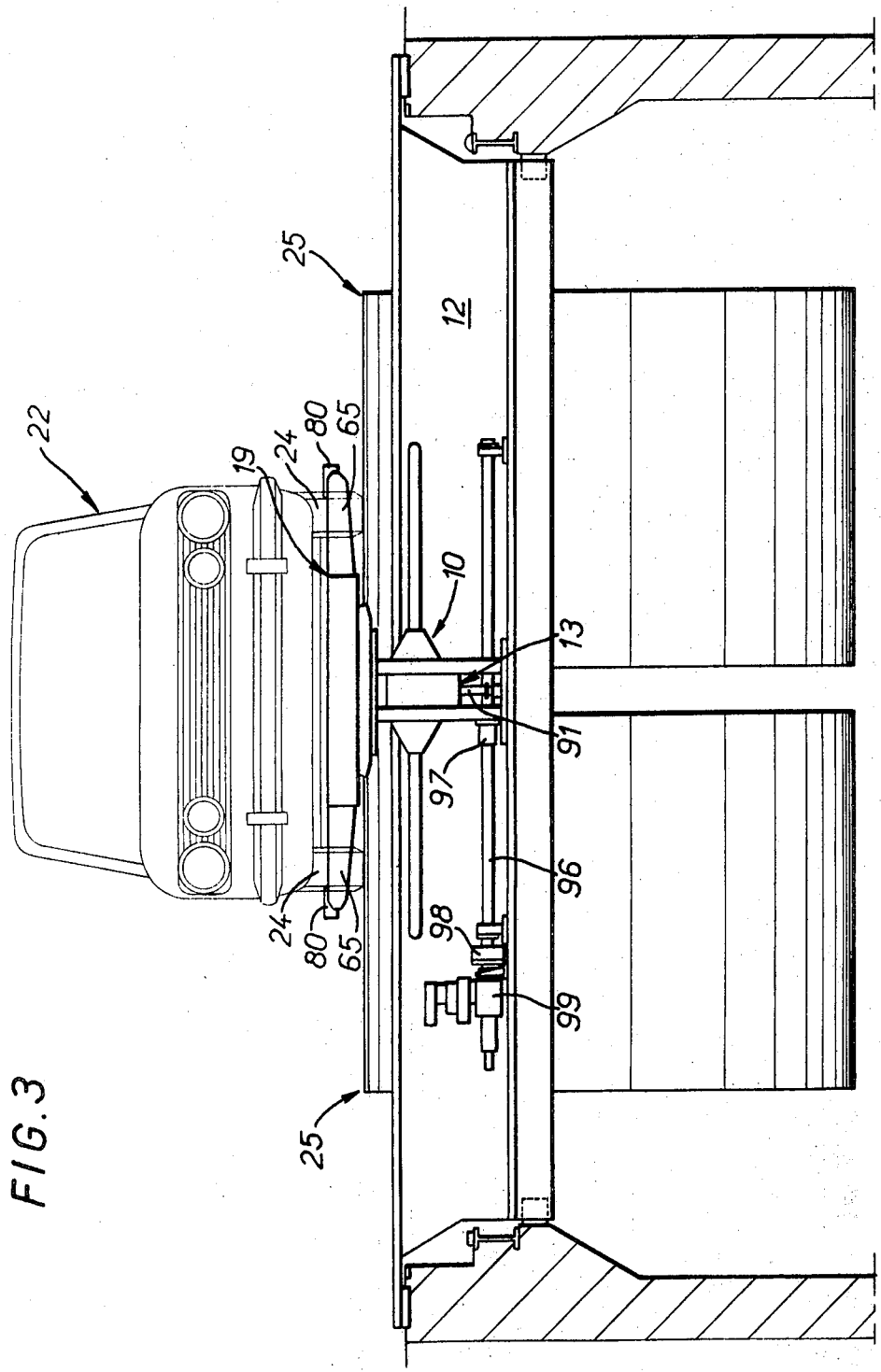

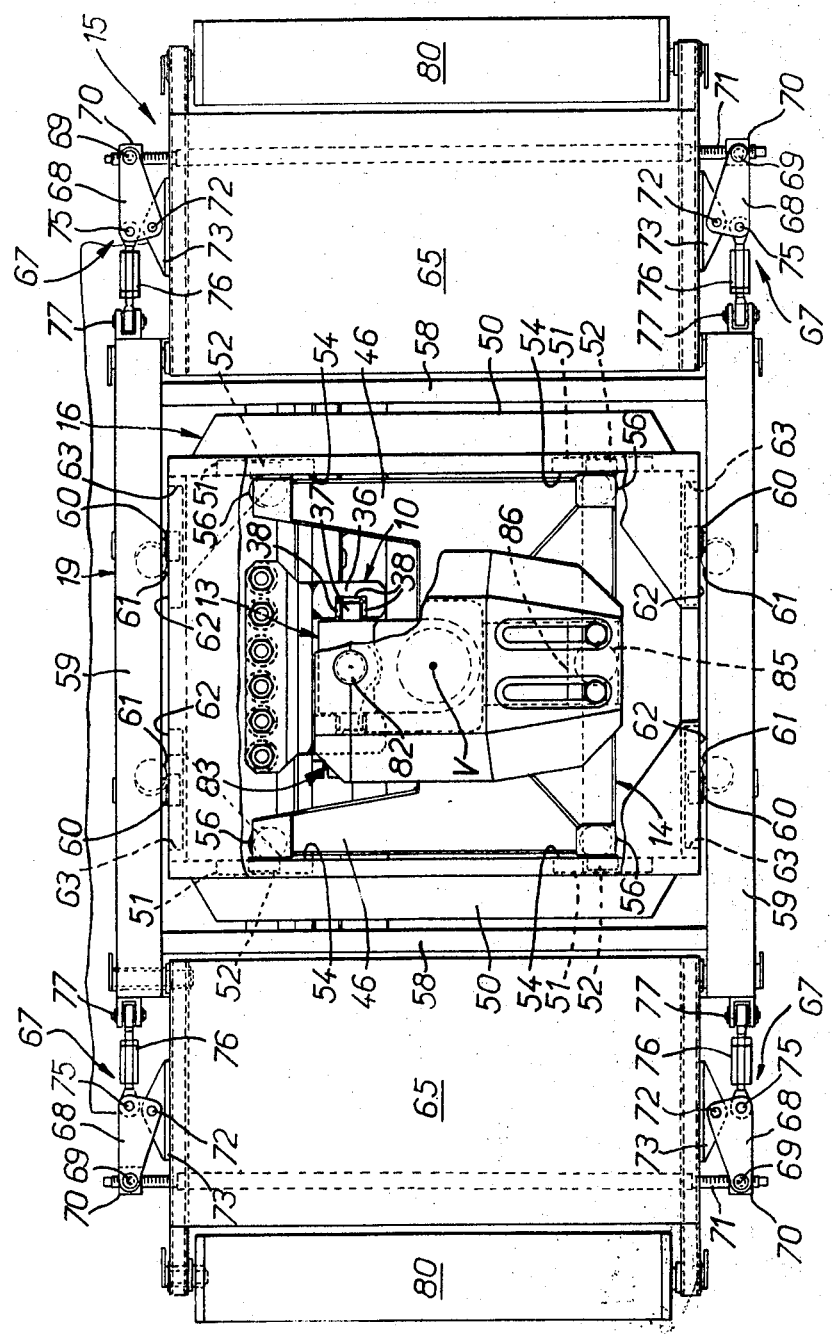

LONGITUDINAL POSITIONING STOP FOR FIXED STATION AUTOMOBILE VEHICLE TEST BEDS

BACKGROUND OF THE INVENTION

1. Field of the invention

The present invention relates generally to fixed station automobile vehicle test beds of the type allowing such vehicle five degrees of freedom of movement, namely:

1. lateral movement of translation in a transverse direction;
2. vertical movement of translation;
3. rotation about a first horizontal axis, which in practice corresponds to the longitudinal axis of the vehicle;
4. rotation about a second horizontal axis, which in practice corresponds to the transversal axis of the vehicle;
5. rotation about a vertical axis.

Only translational movement of the vehicle along its longitudinal axis is prevented, and for this purpose the vehicle is held in place by a longitudinal positioning stop, which advantageously acts at its centre of gravity.

2. DESCRIPTION OF PRIOR ART

Moreover, the wheels of the vehicle under test bear on a running track, which could be a simple moving belt or formed of two rollers, one of which is associated with the front wheels of the vehicle and the other with the rear wheels of the vehicle, but this track preferably comprises four rollers each of which is associated respectively with one of the four wheels of the vehicle, the mass equivalent to total inertia of a running track of this kind being in any case advantageously adaptable to the mass of the vehicle undergoing testing.

On a test bed of this kind the vehicle under test therefore has complete freedom to perform lateral and vertical displacements, and also pitching, rolling and swaying rotations, so that any desired test can be applied to it, particularly braking test, under conditions simulating both running in a straight line and cornering.

The longitudinal positioning stop used in the only construction known up to the present time which permits tests of this kind comprises an assembly of articulated arms and hydraulic cylinders extending on both sides of the vehicle.

Although a construction of this kind has given and still gives satisfaction, and although it offers numerous advantages, particularly with regard to the strictness of the tests which can be made in it, it has some disadvantages which are due particularly to the surface dimensions of its lateral positioning arms and also to the use of hydraulic cylinders associated with these arms.

The present invention relates to a longitudinal positioning stop for fixed station automobile vehicle test beds in which these disadvantages are minimised or avoided.

SUMMARY

According to the present invention a longitudinal positioning stop for fixed station automobile vehicle test beds of the type allowing the vehicle under test five degrees of freedom of movement, namely lateral translation, vertical translation, and rotation about three axes, which are preferably but not necessarily perpendicular to one another, comprises a vehicle support platform, a carriage which is moveable horizontally in a substantially transverse direction, a column mounted for movement in a vertical direction, a bracket mounted for rotation about a vertical axis, a first rotation box permitting rotation about a first horizontal axis, and a second rotating box permitting rotation about a second horizontal axis, the said horizontal axes converging at a centre of rotation located on the said second vertical axis.

In a preferred construction the stop comprises a carriage moveable horizontally with respect to a frame in a direction parallel to a transverse plane (as herein defined) a column mounted for movement vertically with respect to the carriage, a bracket mounted for rotation with respect to the column about a vertical axis, and a vehicle support platform connected to the bracket by universal joint means permitting on the one hand rotation about said first horizontal axis and on the other hand rotation about said second horizontal axis which is perpendicular to the first horizontal axis.

This vertical axis may be in the median plane of vertical guiding means interposed between the carriage and the column.

The vertical axis about which the bracket rotates is preferably offset with respect to the median plane of the preferably offset with respect to the median plane of the vertical guiding means interposed between the carriage and the column. The offsetting or displacement of this vertical axis from the said median plane does not in any way modify the test conditions or the results obtained, while on the other hand it facilitates the arrangement of the associated running track.

However this may be, the vehicle support platform provided with the longitudinal positionin stop of the invention comprises support means which are adjustable in height and intended to receive a vehicle and permit the centre of gravity of the vehicle to be disposed at the said centre of rotation.

The different component parts of the longitudinal positioning stop are advantageously concentrated near a vertical axis (on which the centre of gravity of the vehicle to be tested will be located) below this centre of gravity.

This results in relatively small general surface dimensions as well as the elimination of any hydraulic kinematic connection means.

Finally, because of its very compactness, the longitudinal positioning stop enable parts to be used which have the advantage of good rigidity.

BRIEF DESCRIPTION OF THE DRAWINGS

In order that the invention may be more fully understood some embodiments in accordance therewith will now be described by way of example, with reference to the accompanying drawings, in which:

FIG. 1 is a transverse elevation partly in section of a basic construction of a longitudinal positioning stop;

FIG. 2 is a longitudinal elevation partly in section of the positioning stop of FIG. 1;

FIG. 3 is a transverse elevation of one construction of this longitudinal positioning stop;

FIg. 4 is a plan view of the positioning stop of FIG. 3 with parts cut away;

Figure 5:
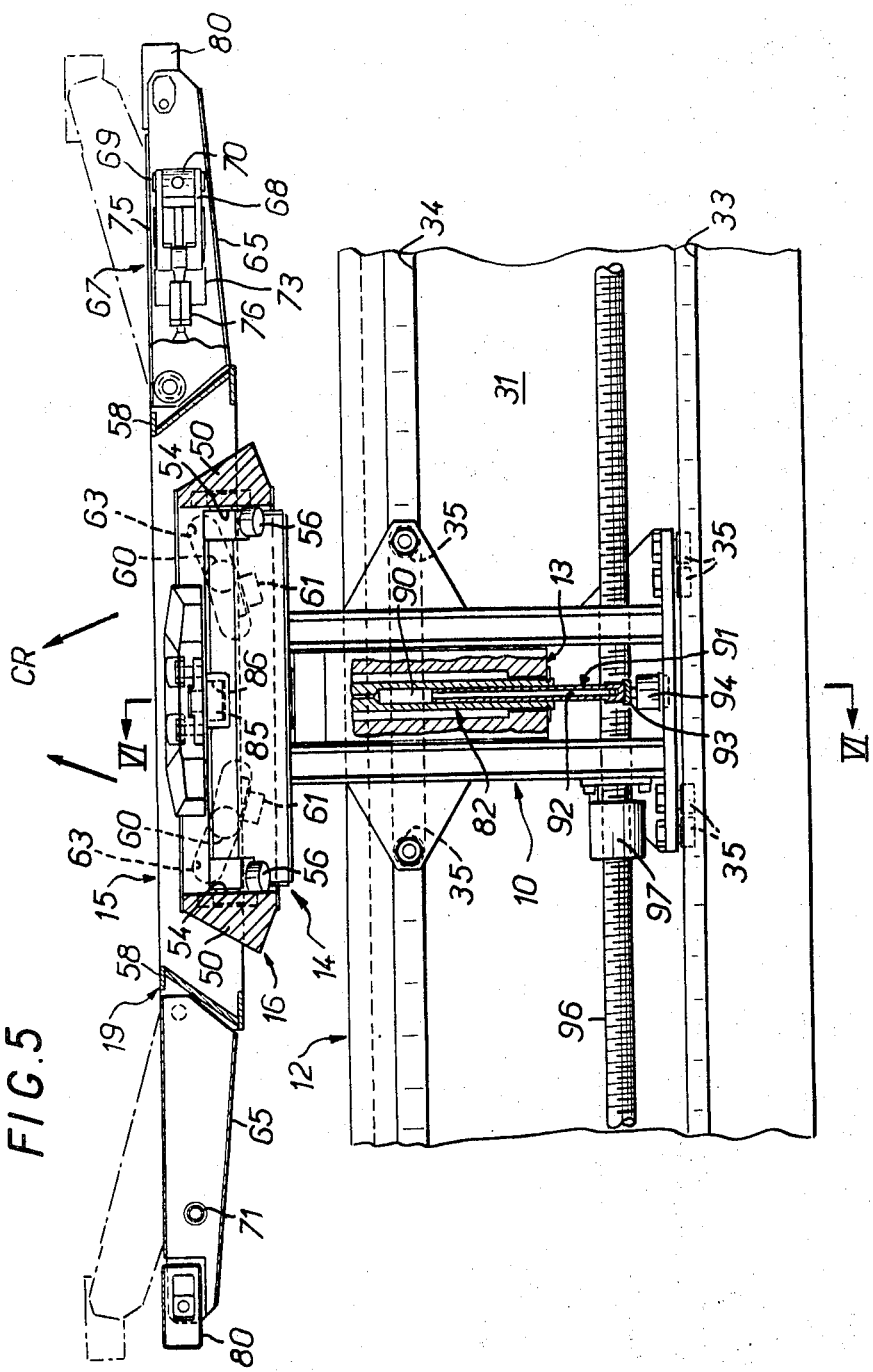
FIG. 5 is a transverse elevation of the positioning stop of FIG. 3 with parts cut away and parts in section; and, FIG. 6 is a longitudinal section along the line VI—VI of FIG. 5 looking in the direction of the arrows

DESCRIPTION OF PREFERRED EMBODIMENT.

Referring to FIGS. 1 and 2, the longitudinal positioning stop comprises as a unit a carriage 10 adapted to move horizontally by rollers 11 on a support or frame 12 in a direction parallel to the plane T (hereinafter called "the transverse plane") and the line of which can be seen in FIG. 2, a column 13 moveable vertically in the carriage 10 in a vertical direction, a bracket 14 mounted for rotation in the column 13 about a vertical axis V, a first rotating box 16 connected to the bracket 14 by an arrangement of slots 17 and rollers 18, a second rotating box 19 connected to the first rotating box by an arrangement comprising slots 20 and rollers 21, and a vehicle support platform 15 carried by a universal joint assembly formed by the two rotating boxes 16, 19.

The construction including the slots 17 and rollers 18 constitutes pivoting means, and in order to make this possible the slots 17 are circular slots the axis of which is a horizontal axis H1 which meets the vertical axis V in the plane T defined above at a point which hereinafter will be referred to as the centre of rotation CR.

The construction including the slots 20 and the rollers 21 likewise constitutes pivoting means, the slots 20 being for this purpose circular slots the axis of which is a horizontal axis H2 passing through the centre of rotation CR.

The rotating box 19 is adapted to carry any vehicle 22 and to permit, by a device which does not require description here, adjustment of this vehicle in position, and particularly in height, until the centre of gravity G of the vehicle coincides with the centre of rotation CR, the vehicle being in addition so placed that its longitudinal axis is, at rest, perpendicular to the transverse plane T.

Moreover, each of the wheels 24 of the vehicle 22 bears on an individual roller 25 preferably along the upper generatrix of the roller, or a generatrix disposed close thereto.

The longitudinal positioning stop prevents any movement of the vehicle 22 in the direction of its longitudinal axis when the driving wheels of this vehicle rotate.

This rotation of the driving wheels has the sole effect of rotating the rollers 25 against which they bear.

Moreover, the vehicle 22 can be displaced laterally along the horizontal axis H2 and it can also move vertically.

In addition it can pivot about the vertical axis V, which corresponds to a rolling movement, and about the horizontal axis H2, which corresponds to a pitching movement.

These five degrees of freedom make it possible for all the desired tests to be carried out.

FIGS. 3 to 6 relate to a preferred form of construction of the longitudinal positioning stop.

The frame 12 has a cross-member fixed to a suitable rigid base and comprises a vertical web 31 and two horizontal flanges 32 and 33 which extend on each side of the web 31 along the upper and bottom edges thereof.

The web 31 and the flanges 32 and 33 are each provided with a groove 34 engaging rollers 35 mounted for rotation on the associated carriage 10.

As can be seen in FIG. 4 this carriage 10 comprises two vertical slide guides 36, each of which is U-shaped and which are disposed opposite one another to form a well in which the associated column 13 is mounted for sliding.

For this purpose the column is provided laterally with two vertical ribs 37, which cooperate for the purpose of vertical guidance with the slide guides 36 of the carriage 10 with the interposition of running means, such as needle runners.

Figure 6:
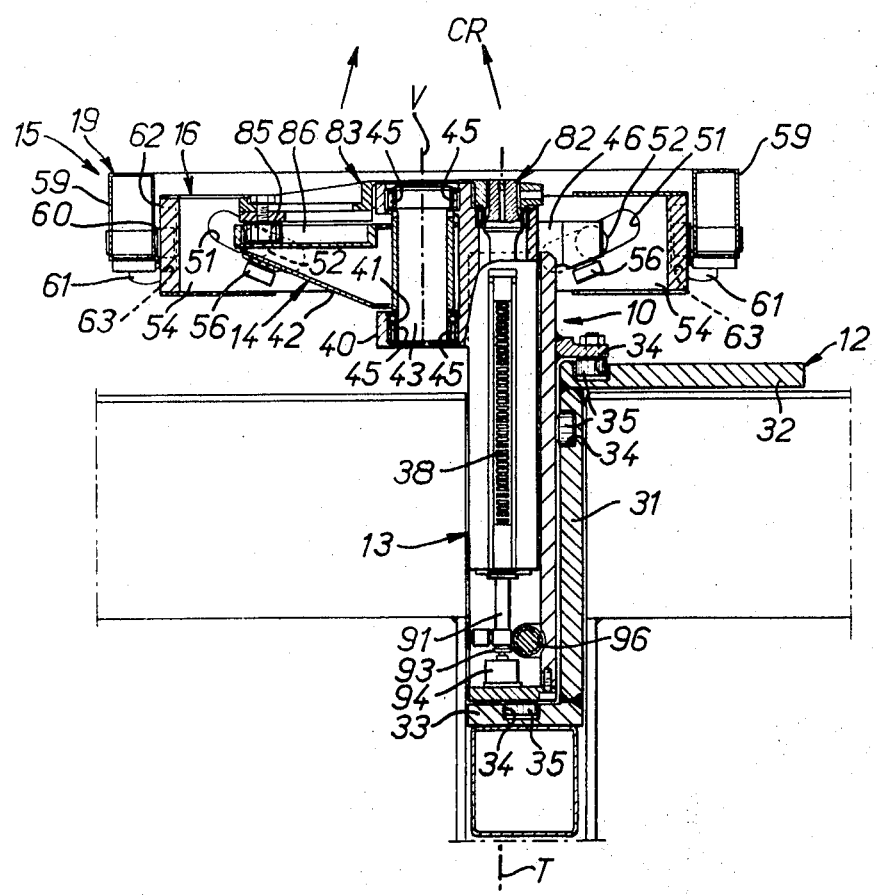

The carriage 10 is moved by the rollers 35 in a direction parallel to the transverse plane T the line of which can be seen in FIG. 6, and the vertical movement of the column 13 in this carriage is effected by the needle runners 38 in a vertical direction in this plane T, which also forms the median plane of the vertical guide means interposed between the column 13 and the carriage 10.

At the top the column 13 carries a cantilever block 40 provided with a cylindrical recess 41 the vertical axis V of which is offset in a direction substantially longitudinal with respect to the Plane T.

As described above, a bracket 14 is mounted for rotation with respect to the column 13. For this purpose, the bracket 14 is provided with a flange 42 carrying a means 43 mounted for rotation in the recess 41 in the cantilever block 40 of the column 13, about the axis V, with the interposition of bearings 45.

This flange has two lateral extensions 46 which embrace the column 13, and the bracket 14 consequently has a general U-shape in a horizontal plane.

A first rotating box 16 in the form of a frame is disposed around the bracket 14. Each of the longitudinal members 50 of this rotating box, which are perpendicular to the plane T, are provided with a circular slot 51 the horizontal axis H1 of which passes through the centre of rotation CR (not visible in the drawing). In the drawings these slots are each divided into two portions.

Running rollers 52 are mounted for rotation on the bracket 14 and engage the slots 51 in the rotating box 16.

The longitudinal members of the box 16 constitute running surfaces 54 which face the bracket 14 and are perpendicular to the horizontal pivoting axis H1 while support rollers 56 mounted for rotation on the bracket 14, in association with the running rollers 52, bear against the surfaces 54.

The rotating box 16 is in turn surrounded by a second rotating box 19 which is also in the form of a frame.

This rotating box 19 thus comprises two longitudinal members 58 parallel to the longitudinal members 50 of the rotating box 15 as well as two cross-members 59 perpendicular to the longitudinal members.

The two rotating boxes 16 and 19 are connected by pivoting means similar to those connecting the rotating box 16 to the bracket 14, the cross-members 59 of the rotating box 19 carry running rollers 60 engaged in circular slots 63 which have a horizontal axis H2 passing through the centre of rotation CR.

In the drawings, the circular slots are each divided into two portions.

As previously, the running rollers 60 have associated with them support rollers 61 mounted for rotation on the cross-members 59 of the rotating box 19, and the support rollers bear on running surfaces 62 provided on the rotating box 16 perpendicularly to the corresponding horizontal pivoting axis H2.

The rotating boxes 16 and 19 carry a vehicle support platform 15, and the latter is equipped with support means adapted to carry a vehicle.

These support means are preferably adjustable in height in order to make it possible to adjust the vertical position of the vehicle to be tested so that its centre of gravity coincides with the centre of rotation CR.

These output means comprise two flaps 65 articulated on the ends of the cross-members of the rotating box 19, along horizontal axes perpendicular to the transverse plane.

These flaps 65 are connected to the rotating box 19 by tie 67 the length of which is adjustable.

A tie 67 of this kind comprises a triangular connecting rod 68 articulated at 69 on a sleeve 70 screwed on a threaded rod 71 mounted for rotation on the corresponding flap 65.

Moreover, the connecting rod 68 is also articulated at 72 on a runner 73 mounted for sliding against the corresponding flank of the flap 65, and is also articulated at 75 to an element 76 mounted for pivoting at 77 on the corresponding cross-member 59 of the rotating box 19.

Through the rotation of the threaded rod 71, the sleeve 70, and consequently the runner 73 are displaced, which corresponds to a lengthening or shortening of the distance separating the threaded rod 71 from the articulation 77 of the ties 76 connecting it to the rotating box 19. This results in raising or lowering the corresponding flap 65 about its pivoting axis, as indicated in broken lines in FIG. 5.

Each flap 65 preferably also carries a support roller 80 articulated about an axis parallel to the axis of articulation of the flap 65 on the rotating box 19, that is to say about an axis perpendicular to the transverse plane T.

These support runners 80 make it possible to provide a horizontal support surface for the vehicle under test, whatever the inclination of the flaps necessary for the adjustment of this vehicle in respect of height.

The utilisation of this longitudinal positioning stop and the possibilities which it offers are similar to those briefly described above. Some additional arrangements will now be described.

The first of these arrangements has the object of supplying correction for the effects due to the convexity of the rollers 25 on which the wheels of the vehicle under test bear, FIG. 3.

When the vehicle is placed crosswise on the rollers 25, because of the convexity of these rollers it is subjected to a parasitic torque which tends to increase its deviation.

This parasitic torque is counteracted by a return torque applied to the bracket 14, for which purpose a torsion bar 82 is disposed coaxially in the column 13.

At the bottom the torsion bar 82 is rotationally fixed on the column 13, for example by a bearing surface of polygonal section engaged in a supplementary recess in the column.

On the top part of the torsion bar 82 there is fixed a return arm 83 which extends substantially horizontally above the flange 42 of the bracket 14. This return arm carries a roller 85 mounted for rotation about a vertical axis, a buttonhole arrangement making it possible to adjust the position of this roller along the return arm 83 carrying it, in accordance with the characteristics of the vehicle tested.

This roller 85 engages a slot 86 provided in the top part of the flange 42 of the bracket 14, and cooperates with the flanks of this slot.

When the bracket 14 pivots about the vertical axis V it carries with it the return arm 83, and the latter applies torsion to the torsion bar 82. This produces a return torque which, when transmitted by the arm 83 and the roller 85 to the bracket 14, returns the latter to its middle position of rest.

A second arrangement aims to compensate for the vertical parasitic inertia of the moving parts, and also their weight.

For this purpose a chamber 90 is provided axially in the torsion bar 82 and a piston 91 is engaged to slide in this chamber, the piston having provided in it an axial channel 92 enabling fluid under pressure to be introduced into the chamber 90. At its bottom end this piston 92 bears with the interposition of a ball thrust bearing 93 and a force pick-up 94, on the bottom end of the vertically fixed carriage 10.

The force pick-up 94 is intended to measure the vertical stress taken by the piston 91, and with the aid of a servo device controlled particularly by an accelerometer (not shown), it controls accordingly the amount of fluid under pressure to be delivered into the chamber 90 to compensate not only for inertia effects but also for parasitic effects of gravity. The ball thrust bearing 93 transmits this vertical stress to the force pick-up 94 without hindering the pivoting of the torsion bar 82.

A third arrangement has the object of providing the carriage 10 with thrust means capable of displacing it.

These thrust means comprise a reversible screw 96, preferably a ball type screw, cooperating with a nut block 97 fastened to the carriage 10, FIGS. 3 and 5.

This nut is provided with a force pick-up adapted to measure the axial stress applied by the screw 96 (not detailed).

The screw 96 is adapted to be driven rotationally through an electromagnetic clutch 98, by a servo motor 99 under the control of a servo device controlled by the force pick-up contained in the nut 97, in accordance with a similar process to that described above in connection with the force pick-up 94.

Through the rotation of the screw 96 the servo motor 99 makes it possible to apply to the carriage 10 a correcting force tending to compensate for the inertia of this carriage and of the elements carried by it, particularly in dependence on acceleration.

Because the various contacts between moving parts are made without friction, everything takes place as if this correcting force were applied direct to the centre of gravity of the vehicle.

The same is naturally true of the correcting force applied vertically to compensate for the vertical inertia of the parts concerned and for their force of gravity.

For various simulations, particularly for simulating a cross-wind, the screw 96 makes it possible to superimpose a certain determined stress on the correcting force.

The electromagnetic clutch 98 makes it possible to uncouple the screw 96 from the servomotor 99, since this screw 96 is reversible, the carriage 10 can then move freely.

Safety means (not shown) are also provided for automatically effecting this uncoupling in the event of incorrect operation of the servo-control device.

The pivoting means interposed between any pair of elements comprising a rotating box and a bracket, or between the rotating boxes themselves, and also in connection with the distribution of the slots and rollers between these elements may be of any suitable form.

Furthermore, the flap 65 could pivot about axes parallel to the transverse plane T.

In various possible alternative embodiments, the relative order of the elements constituting the stop are modified. For example the carriage carries the column, and not vice versa, and/or the bracket carries the column and not vice versa.

The bracket and the column may moreover constitute one and the same part, which is adapted to turn and to move axially.

The pivoting axes of the rotating boxes are not obligatorily at right angles to one another.

Generally speaking, each of the component elements of the stop of the invention may be replaced by a technical equivalent, for example, the ball type screw constituting a thrust means for the carriage may be replaced by a power cylinder, and/or the mechanical means for rotation and translation mentioned may be replaced by fluidic means, such as an air pivot, air cushion, or fluid bearing.

I claim:

1. A longitudinal positioning assembly for fixed station automobile vehicle test stands enabling movement of a vehicle laterally and vertically and rotatably about three axes, comprising a support, a carriage mounted for horizontal movement on and relative to the support, a column mounted for vertical movement on and relative to said carriage, a bracket mounted for rotation on and relative to said column about a vertical axis, a vehicle support platform mounted on the bracket for carrying a vehicle to be tested on said assembly, and universal joint means disposed between the bracket and the vehicle support platform for rotation of the vehicle support platform about first and second mutually perpendicular axes intersecting on said vertical axis.

2. An assembly according to claim 1 wherein said first, second and vertical axes are mutually perpendicular.

3. An assembly According to claim 1 wherein said frame comprises a transverse member having a vertical web and two horizontal flanges along the bottom and top edges of said web, a slot in each of said web and flanges, and rollers mounted on said carriage cooperating with said slots.

4. An assembly according to claim 1 wherein said carriage comprises two vertical slide guides, and said column has vertical guiding ribs thereon cooperating with said slide guides.

5. An assembly according to claim 4, and rolling means between the said column and said guide.

6. An assembly according to claim 1 wherein said vertical axis about which said bracket rotates is in the median plane of said vertical guide means between said carriage and said column.

7. An assembly according to claim 1 wherein said vertical axis about which said bracket rotates is offset with respect to the median plane of said vertical guiding means between said carriage and said column.

8. An assembly according to claim 7 wherein said bracket is U-shaped in plan and has a flange having rotation means and two lateral extensions embracing said vertical column.

9. An assembly according to claim 8 further comprising a lateral block carried in a cantilever by said column, and wherein said rotation means of said bracket acts with the lateral block.

10. An assembly according to claim 1 further comprising an assembly of two boxes and wherein said support platform is carried by the assembly of two boxes, pivoting means connecting said box to said bracket and pivoting means connecting the other box to the first box.

11. An assembly according to claim 10 wherein said pivoting means for said one pair of elements formed by said box and said bracket and for said other pair of elements formed by two said boxes, comprises a circular curved slot in one of said elements and running rollers mounted on the other of said elements and engaged in said slot.

12. A stop according to claim 11 and support rollers rotatably mounted on one of said elements and bearing against a running surface on said other element perpendicularly to the corresponding axis of rotation.

13. An assembly according to claim 10 wherein said first box forms a frame surrounding said bracket.

14. An assembly according to claim 10 wherein said second box forms a frame surrounding said first box.

15. An assembly according to claim 10 wherein said support means is adjustable in height and comprises two flaps articulated on said second box about horizontal parallel axes.

16. An assembly according to claim 15 further comprising ties adjustable in length and wherein said flaps are coupled to said second box by the ties.

17. An assembly according to claim 15 wherein each of said flaps carries a support runner articulated on said flap about an axis parallel to said axis of flap articulation.

18. An assembly according to claim 1 wherein said support platform comprises fork means adjustable in height.

19. An assembly according to claim 1, and a torsion bar carried by the column, an arm fixed to and extending transversely of the torsion bar, a roller carried by the arm, and a slot carried by the bracket and receiving the roller to urge the bracket to a median position.

20. An assembly according to claim 19 wherein said roller is adjustable in position along said arm.

21. An assembly according to claim 1 and a chamber containing fluid under pressure in said vertical column, and a piston slidably disposed in said chamber which at one of its ends bears on said frame.

22. An assembly according to claim 21 and means between said piston and said frame for controlling the pressure in said chamber.

23. An assembly according to claim 1 and thrust means for moving said carriage along said support.

24. An assembly according to claim 23 wherein said thrust means comprises a nut fastened to said carriage and a reversible screw screwed in said nut.

25. An assembly according to claim 23 and means responsive to the force between the frame and the carriage to control the operation of said thrust means.

* * * * *